July 15, 1952 H. D. HUME 2,603,346
ADJUSTABLE CONVEYER FOR HARVESTERS
Filed April 1, 1947 5 Sheets-Sheet 1
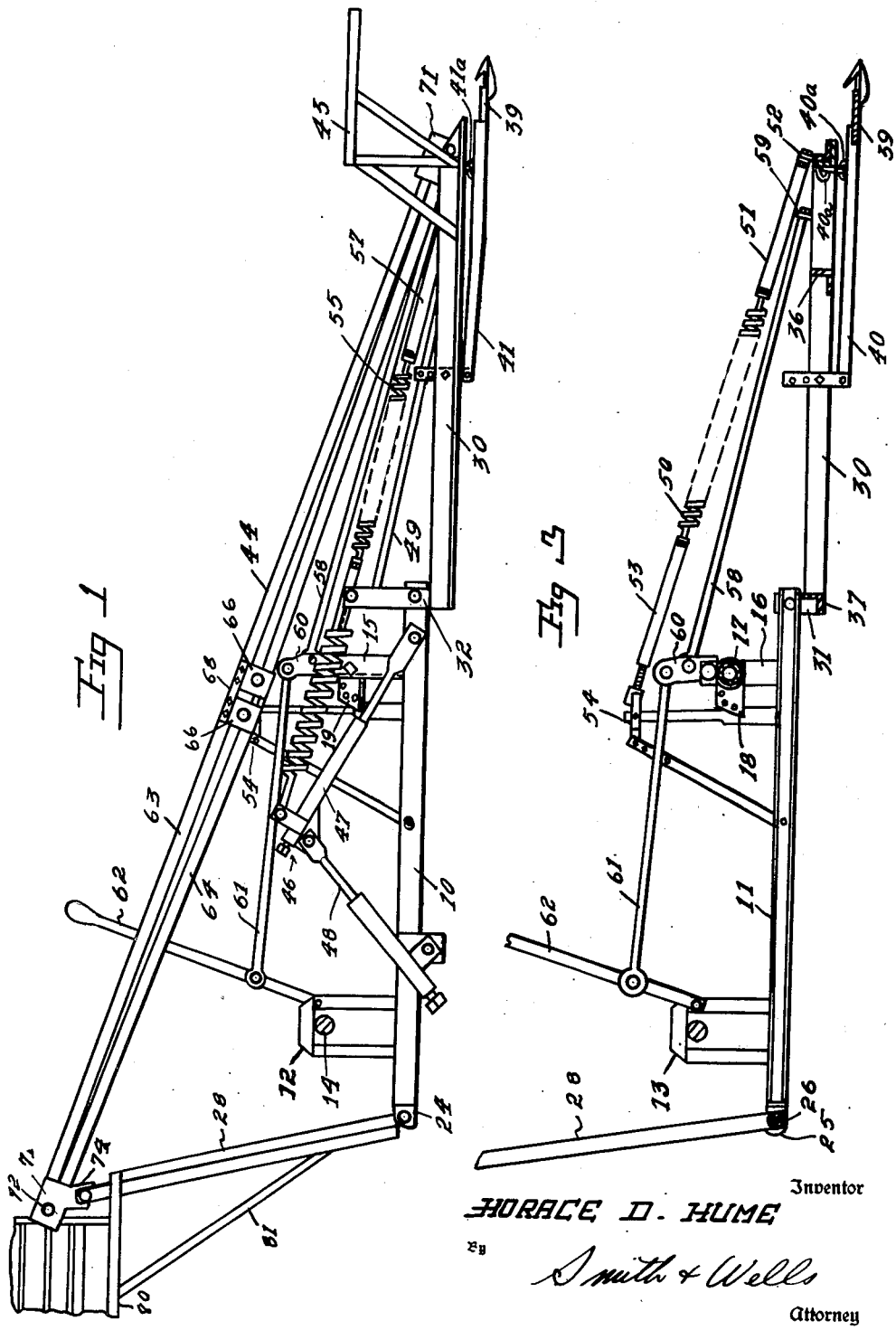
Inventor
HORACE D. HUME
By
Smith & Wells
Attorney

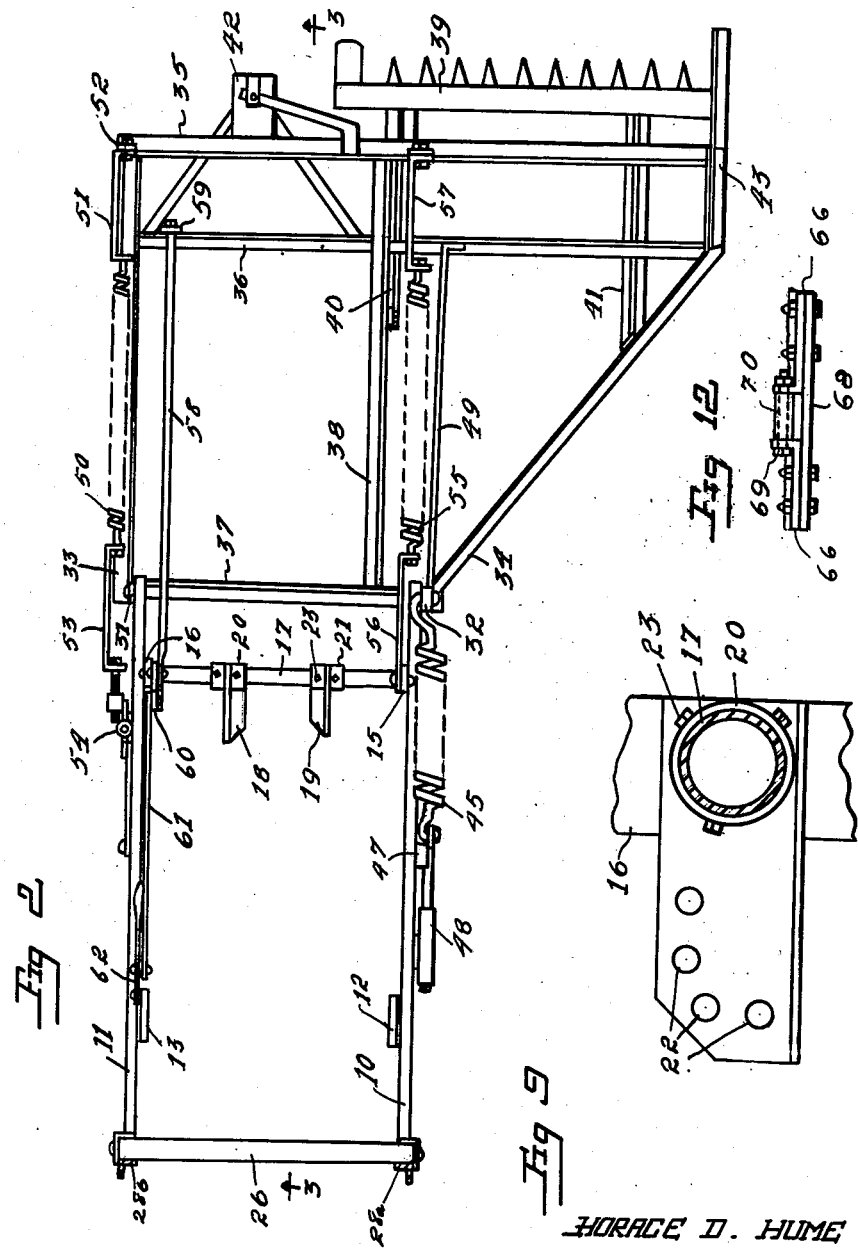

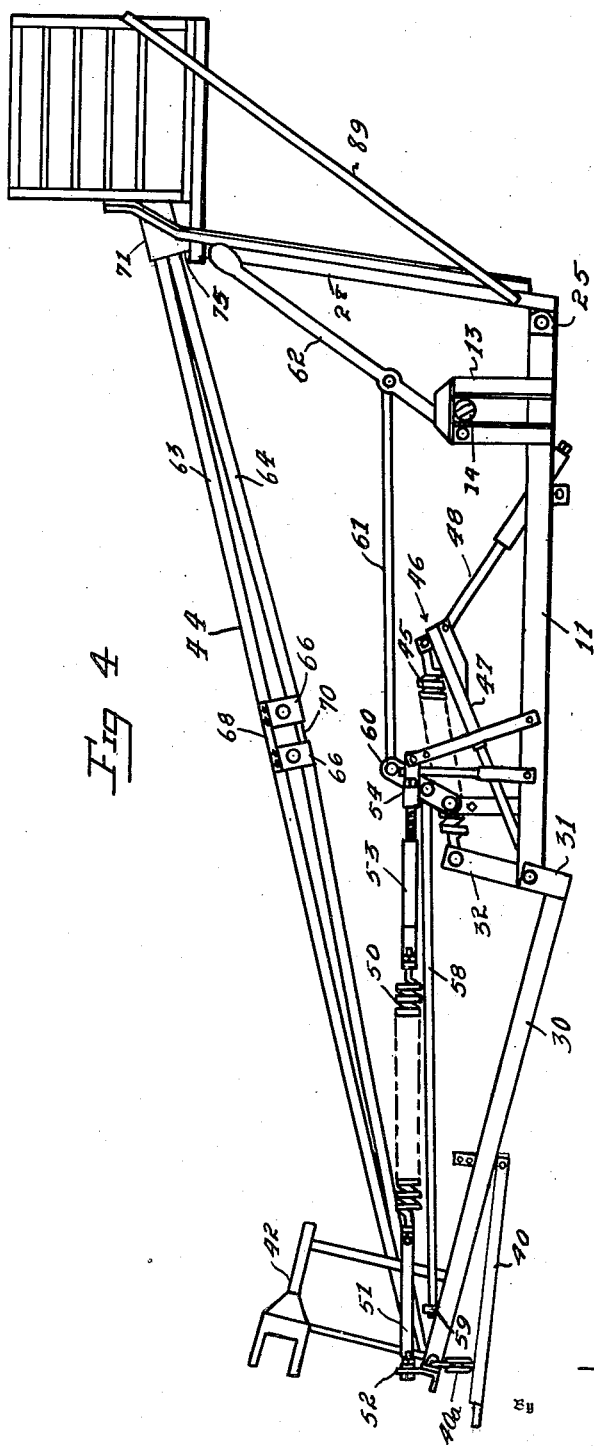

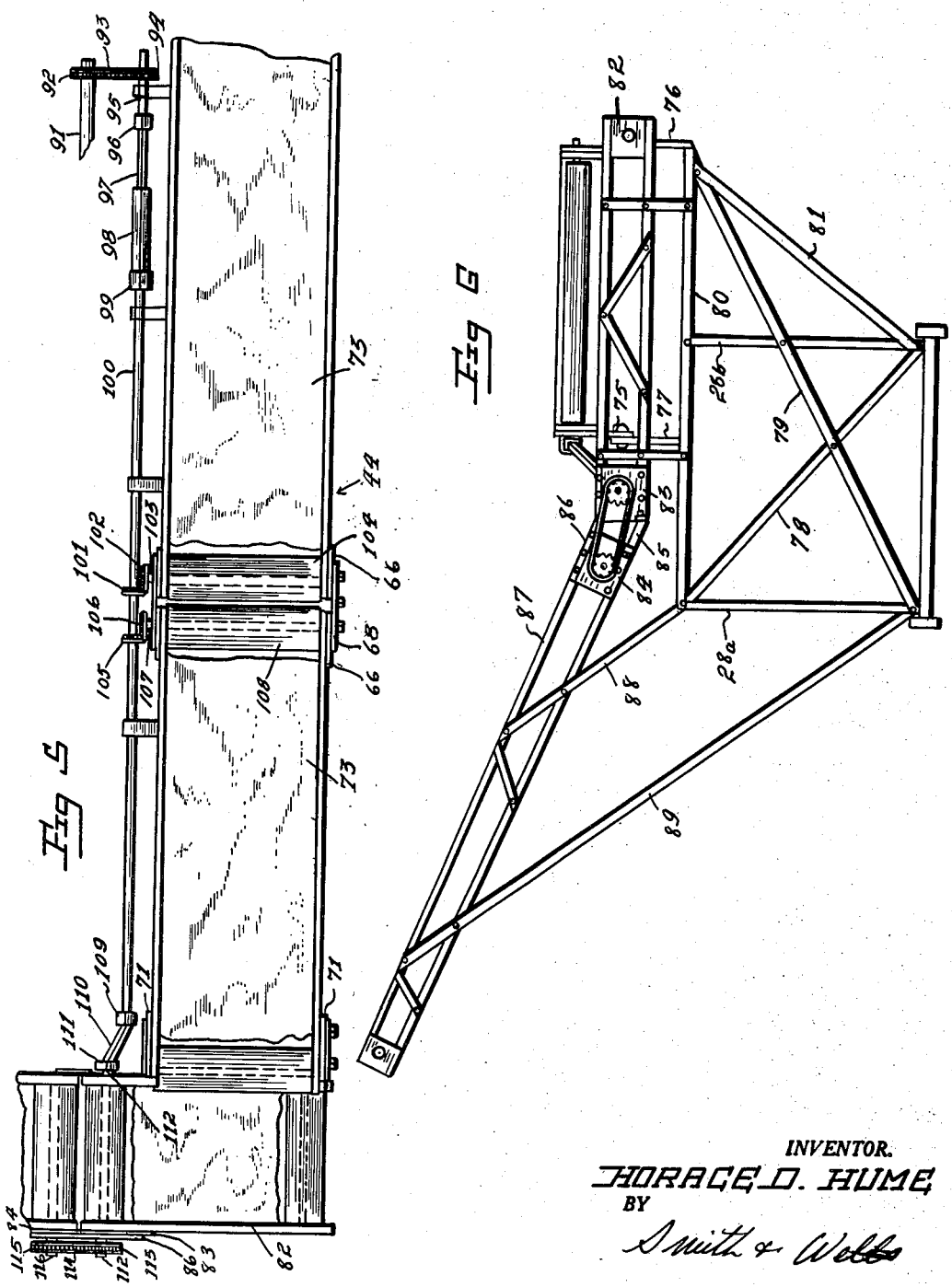

July 15, 1952 H. D. HUME 2,603,346
ADJUSTABLE CONVEYER FOR HARVESTERS
Filed April 1, 1947 5 Sheets-Sheet 5
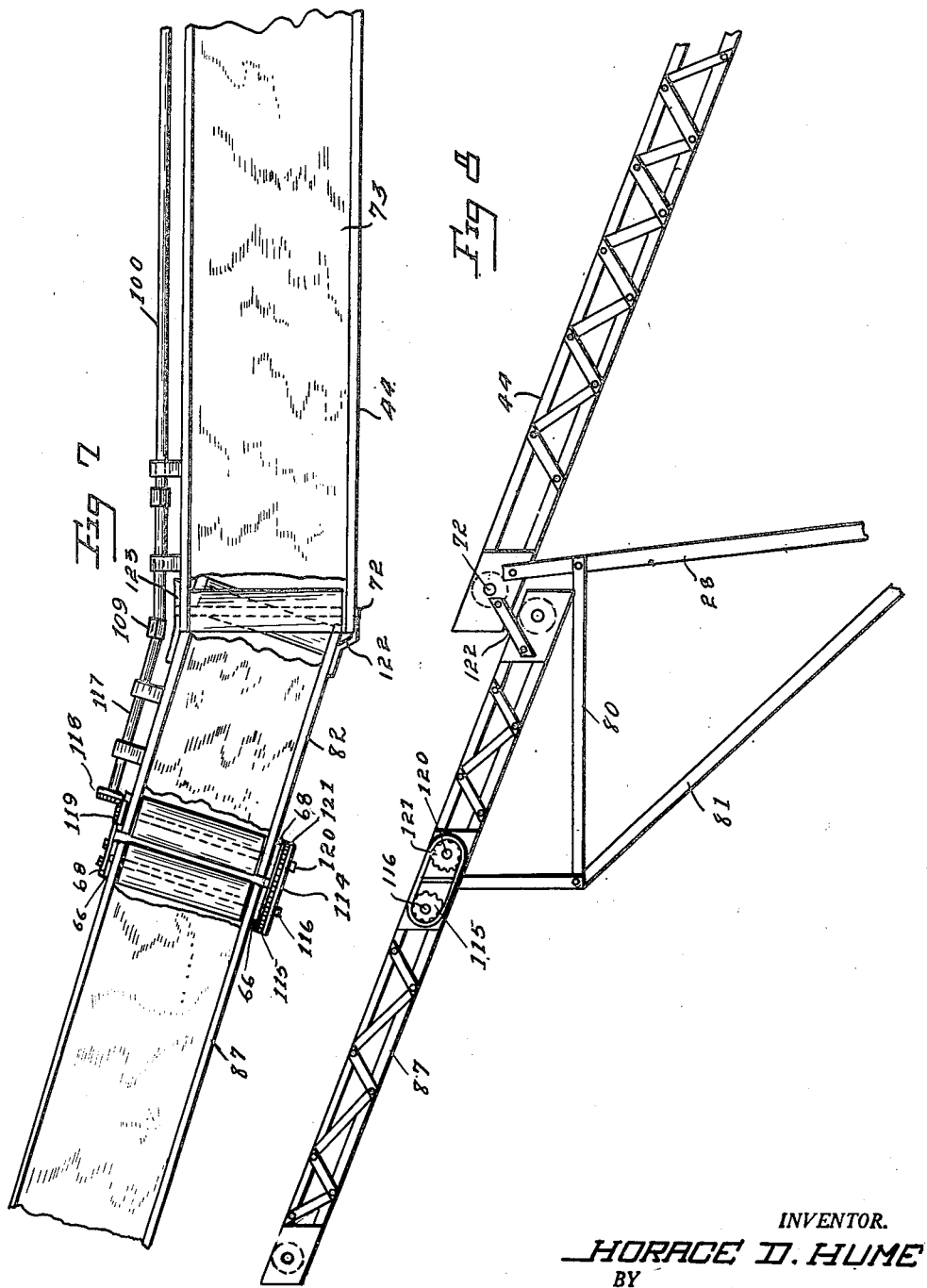
INVENTOR.
HORACE D. HUME
BY
Smith & Wells Patented July 15, 1952

2,603,346

UNITED STATES PATENT OFFICE 2,603,346

ADJUSTABLE CONVEYER FOR HARVESTERS

Horace D. Hume, Mendota, Ill.

Application April 1, 1947, Serial No. 738,563

6 Claims. (Cl. 198—233)

This invention relates to improvements in an adjustable conveyor for harvesters for harvesting various crops, and is particularly adapted for the cutting and loading of such crops as peas, soy beans, and the like. The invention is directed toward a machine wherein a cutting mechanism and elevating mechanism are provided in a single power driven unit in such a way that the tractor or power unit carries the cutting and elevating mechanism. The construction is such as to provide extreme flexibility in the movement of the cutting mechanism so that it can keep the contour of the ground easily, yet the entire cutting and loading mechanism is carried as a single unit by the power unit with adequate flexibility and strength to sustain the rough usage that a harvester of this character must undergo in the various cases of field conditions that are encountered.

One purpose of the invention is to provide a support mechanism which has means to operatively mount the cutter bar, reel and elevating drapers and which is so constructed as to provide rigid frames for the elevating drapers which are supported with the cutter bar mechanism and the reel unit to have limited movement with respect to the vehicle carrying the mechanism; the whole unit being supported in a balanced fashion so that the reel and cutter bar and the front of the elevating draper frame can be lifted easily without in any way interfering with the fundamental rigidity of the draper frame.

More particularly, it is an object of this invention to provide a novel supporting frame work for the elevating drapers, the cutter bar, and the reel wherein the frame work consists of a triangular arrangement with two sides of the triangle being substantially fixed in length and the third side, which is the bottom side and the controlling side, being capable of expansion and contraction in length, under a spring control to provide a floating support for the cutter bar and reel and for the front end of the draper frame.

It is also a purpose of this invention to provide a mechanism of this character which readily adapts itself to the delivery of the cut and elevated crop to the side or to the rear of the power unit without any change in the basic cutting and elevating unit.

The novel features of my invention are set forth with particularlity in the amended claims. The invention itself, however, both as to its organization and its method of operation, together with additional objections and advantages thereof, will best be understood from the following description of a specific embodiment when read in connection with the accompanying drawings in which:

Figure 1 is a view in side elevation of the device which is mounted on a tractor;

Figure 2 is a plan view of the bottom framework of the device;

Figure 3 is a sectional view taken on the line 3—3 of Figure 2;

Figure 4 is a view in side elevation taken from the side opposite that shown in Figure 1 and showing the front end raised;

Figure 5 is a fragmentary plan view of the elevating draper frames and drive mechanism therefor;

Figure 6 is a rear end view of the draper frame supporting mechanism;

Figure 7 is a fragmentary plan view, similar to Figure 5, but showing the parts arranged for rear loading;

Figure 8 is a fragmentary side view of the parts shown in plan in Figure 7;

Figure 9 is an enlarged fragmentary view of the mounting bracket and cross bar connection used in supporting the framework from a tractor frame;

Figure 10 is an enlarged fragmentary sectional view illustrating the pivotal mounting of the upright frame at the rear of the device;

Figure 11 is an enlarged sectional view of the extensible rod members used.

Referring now to the drawings, the present invention comprises the provision of a novel mechanism for supporting an elevating draper in combination with the reel and cutter bar of a harvester on a vehicle such as a farm tractor. The construction is such that the mechanism can be adapted very easily to any one of about a dozen well known makes of farm tractors. For this purpose I provide two side frame bars 10 and 11, which have pedestals 12 and 13 adapted to be suspended from the main axle 14 of the tractor. Preferably the side frame bars 10 and 11 are made of steel channels and the pedestals 12 and 13 are built up from angle iron and welded to the channels. Near the front ends of the bars 10 and 11 I mount two uprights 15 and 16. These uprights are connected by a tubular cross bar 17 which is bolted to the uprights. The tubular cross bar, as shown best by Figure 9, has two brackets 18 and 19 mounted thereon by means of collars 20 and 21. The brackets are provided with several apertures as shown at 22 for bolts by which they may be secured to the tractor framework. The brackets are secured on the bar 17 by set screws 23 in the collars 20 and 21. The construction of the brackets 18 and 19 may vary considerably to fit the different tractor models. Also the elevation of the bar 17 on the uprights 15 and 16 may vary for different tractors.

The rear ends of the side frame bars 10 and 11 are provided with mounting ears 24 and 25 that are welded to the bars. These ears have a bar 26 pivotally mounted thereon (see Figure 10) by means of pivot pins 27. The bar 26 serves as a lower support for an upright frame 28.

The front ends of the bars 10 and 11 have the cutter bar and reel supporting frame 30 suspended therefrom by two upwardly extending bars 31 and 32 welded to the rear ends of the frame side pieces 33 and 34. The bars 31 and 32 are pivoted to the bars 10 and 11 and the bar 32 extends above the bar 11 to serve as a lever, in a manner to be described later, for balancing the weight of the parts supported by the frame 30.

The frame 30 comprises the side pieces 33 and 34, a front cross piece 35, an intermediate cross piece 36, a rear cross piece 37, and a front to rear intermediate frame piece 38, all of angle iron. A cutter bar 39 is suspended from the frame 30 by means of supporting bars 40 and 41 and chains 40a and 41a. The frame 30 also mounts reel supporting frames 42 and 43, with suitable bracing. The reel and the driving mechanism therefor form no part of the present invention.

A frame 44 for the elevator draper is pivotally mounted at its rear end to the upper end of the upright frame 28. It is also pivoted at its forward end to the frame 30. As shown best by Figures 1 and 3, the frame 44 forms the top side, of fixed length, of a triangular framework, the rear side of which is made up of the side frame bars 10 and 11 and the frame 30 with the bars 31 and 32.

The bars 31 and 32 may swing about their pivots on the ends of the bars 10 and 11 to lengthen or shorten the bottom leg of the framework. The bars 10 and 11 are fixed on the tractor frame so the frame 30 swings up at its free end when the bars 31 and 32 are moved from the position shown in Figures 1 and 2 to that shown in Figure 4.

According to my invention I provide a mechanism for utilizing the frame construction just described to carry the crop cutting and elevating equipment and to control their position so that they will follow the ground surface closely under all sorts of conditions.

As best shown by Figures 1 to 4, the control mechanism comprises a coiled spring 45 having one end secured to the upper end of the lever bar 32. The other end of this spring is connected to a support 46 which is composed of two members 47 and 48 having their upper ends pivotally joined to each other and having their lower ends pivotally mounted on the side frame bar 10 (see Figure 1). These rod members 47 and 48 are constructed as shown in Figure 11, so that they may be extended or reduced in length to vary the tension on the spring 45. The lever bar 32 is also braced by a brace rod 49 that extends forwardly from the upper end of the bar 32 to the cross piece 36 where it is anchored.

Another part of the control mechanism comprises a coiled spring 50, one end of which is connected by a rod 51 to a lug 52 on the front cross piece 35. The other end of the spring 50 is connected by an extensible rod 53 to a standard 54 which is mounted on the side frame bar 11 so that the tension on the spring 50 may be adjusted. A third spring 55 is connected between the top end of the upright 15 and the cross piece 35 by rods 56 and 57. The three springs 45, 50 and 55 cooperate to form a yielding support for the front end of the frame 30 to balance the weight carried thereby in order that the cutter bar and reel may follow the contour of the ground. The tension on the springs may be adjusted to suit the crop conditions encountered. Heavy wet crops require more tension on the springs than lighter dry crops.

In Figure 4 of the drawings the machine is shown with the front end raised for road travel as in moving from one field to another. In this figure certain of the springs and rods are left out for the sake of clarity. The means for lifting and holding the frame lifted comprises a rod 58 having one end fastened to a lug 59 that is secured on the cross piece 36 at its junction with the side piece 33 of the frame 30. The other end of the rod 58 is fastened to a lever 60 intermediate the ends thereof. The lower end of the lever 60 is pivoted on the upright 16. A link 61 connects the upper end of the lever 60 to a hand lever 62, which is pivotally secured at its lower end to the pedestal 13. It is believed to be evident that, by moving the hand lever 62 to the position shown in Figure 4 from the position shown in Figures 1 and 3, the entire front end of the mechanism can be lifted as shown.

Referring now to Figures 5 to 8 inclusive, in these figures the general arrangement of the crop elevating means is illustrated. These means are shown generally in Figures 1 and 4 but the details are illustrated more fully in Figures 5 to 8.

The draper frame work 44 is composed of two duplicate side frames, each side frame is composed of two sections which are substantially duplicates. These sections each comprise a top bar 63 and a lower bar 64. The bars 63 and 64 are shown spaced closer together at one end than at the other end in Figures 1 and 4, but as shown in Figure 8, they may be spaced equal distances apart at both ends. At one end of each section a plate 66 is bolted or welded to the bars 63 and 64. The plate 66 serves as a mounting means for a connecting strap 68 which is bolted to the adjacent plate of the next section to make up a composite side frame. The plates 66 are also tied together at the edges opposite the strap 68 by bolts 69 and spacing elements 70 in the form of sleeves (see Figure 12). The construction is such that the top bars 63 of the two adjacent frame sections are substantially in line. The outer ends of the frame sections have plates 71 thereon which form mounting means for draper roller shafts 72. As an example of the shaft structure normally employed, the draper frames composed of two side sections such as that just described, are approximately 7 feet long so that when the sections are placed end to end they form a frame work about 14 feet long, which frame work carries two draper belts 73 meeting in the middle of the frame work.

The upper end of the frame 28 is pivoted to ears 74 and 75 that are formed on the plates 71. The frame 28 has brackets 76 and 77 (see Figure 6) thereon providing the members for attachment to the ears. The rear frame 28 has upright members 28a and 28b and diagonal braces 78 and 79, the diagonal brace 79 being extended as shown to support the right hand end of the top frame 80. A rearwardly extending brace 81 braces the back end of the frame 80. The frame 80 supports a short cross draper section 82 which is coupled by end plates 83 and 84 and straps 85 and 86, to a loading draper section 87, which is of the same construction as the draper frames of the main elevator draper framework 44. The additional braces 88 and 89 are used to support the section 87.

The manner of supplying power to the draper rollers is illustrated best in Figure 5 where the power take off arrangement for a side loading machine is illustrated. The power take off shaft 91, which is suitably connected to the tractor, has a sprocket wheel 92 near the front end of the draper frame 44 which is connected by a chain 93 to a sprocket 94 on a stub shaft 95 that is carried by the frame 30 and provided with suitable bearings. This stub shaft 95 is connected by a universal joint 96 to a square shaft 97 which slides in a sleeve 98 having a square bore so as to provide for longitudinal extension and contraction of the drive section composed of the parts 97 and 98 while they must rotate together. The sleeve 98 in turn is connected by a universal joint 99 to a shaft 100 that is journalled in bearings provided on one side of the draper frame. The shaft 100 has a beveled gear 101 at its upper end meshing with a gear 102 on a draper roller shaft 103 that extends across the draper frame and carries the draper roller 104. The shaft 100 also has a gear 105 thereon which is connected to a gear 106 on the second draper shaft 107. This draper shaft has the draper roller 108 thereon which drives the upper draper section on the draper frame. The shaft 100 leads to a universal joint 111 and a draper roller shaft 112 that drives a draper in the short draper frame 82 that is mounted directly beneath the upper end of the draper frame 47. The shaft 112 has a sprocket wheel 113 thereon which is connected by a chain 114 to a sprocket wheel 115 on a draper shaft 116 which is mounted in the draper frame 87. The draper frame 87 is one of the seven foot sections previously described.

When rear loading is being carried out in contrast to side loading the draper frame 82 instead of being supported at right angles to the main draper frame is mounted to extend at an angle of about 15 or 20 degrees as illustrated in Figure 7. The short draper can in this case extend underneath the main frame 44 and preferably is extended upwardly at essentially the same angle as the main frame 44 (see Figure 8). The draper frame 87 is then connected to the end of the frame 82 with straight connecting bars 68 such as are used in the main frame 44. In order to drive the drapers in the frames 82 and 87 in this construction, the universal joint 109 connects to a shaft 117 that is mounted in bearings on the side of the frame 82. This shaft carries a bevelled gear 118 which meshes with a bevel gear 119 on a draper rollershaft 120 and connection is made between the shafts 120 and 116 by sprocket wheels 121 and 115 and the sprocket chain 114 in the same manner as in the side load mechanism. The frame 82 is fastened in place by straps 122 and 123.

It is believed to be clear, from the foregoing description, that I have provided a novel combination framework for the cutting and loading mechanisms of a crop harvesting machine. The arrangement of the framework is such that it provides for the necessary flexibility and floating action of the cutter bar and reel supports with a minimum of movement on the part of the elevating and loading mechanism.

Having thus described my invention, I claim:

1. A mechanism for supporting crop cutting and loading means from the framework of a vehicle such as a tractor, comprising, a lower mounting framework having means to mount it on the vehicle framework, a front frame, upwardly extending bars fixed to the rear of said front frame and pivoted to the mounting framework above the front frame, an upright frame pivoted on the rear end of the mounting framework, an elevator frame pivoted to the front end of the front frame and to the upper end of the upright frame, and control means on the mounting framework for moving the front frame about the pivots of said bars on the mounting framework, thereby raising and lowering the forward end of said front frame.

2. A mechanism for supporting crop cutting and loading means from the framework of a vehicle such as a tractor, comprising, a lower mounting framework having means to mount it on the vehicle framework, a front frame, upwardly extending bars fixed to the rear of said front frame and pivoted to the mounting framework above the front frame, an upright frame pivoted on the rear end of the mounting framework, an elevator frame pivoted to the front end of the front frame and to the upper end of the upright frame, and control means on the mounting framework for moving the front frame about the pivots of said bars on the mounting framework, thereby raising and lowering the forward end of said front frame, said control means including standards on the mounting framework and coiled springs connecting the standards with the forward portion of the front frame.

3. A mechanism for supporting crop cutting and loading means from the framework of a vehicle such as a tractor, comprising, a lower mounting framework having means to mount it on the vehicle framework, a front frame, upwardly extending bars fixed to the rear of said front frame and pivoted to the mounting framework above the front frame, an upright frame pivoted on the rear end of the mounting framework, an elevator frame pivoted to the front end of the front frame and to the upper end of the upright frame, and control means on the mounting framework for moving the front frame about the pivots of said bars on the mounting framework, thereby raising and lowering the forward end of said front frame, said control means iincluding standards on the mounting framework, a coiled spring connecting one standard with the forward portion of the front frame and another coiled spring connecting another standard with one of said bars above its pivot.

4. In a harvesting device for cutting and loading crops, a top rigid framework providing a support for an elevator draper, a rear upright frame, also rigid, pivoted to the rear end of said top framework, and extensible means connecting the lower end of said upright frame with the front end of the top framework, comprising a mounting framework having means to mount the device on a vehicle, and a front frame having its front end pivoted to the front end of the top framework and its rear end vertically spaced below the mounting framework and bars, rigid with the front frame, pivoted on the mounting framework.

5. In a harvesting device for cutting and loading crops, a top rigid framework providing a support for an elevator draper, a rear upright frame, also rigid, pivoted to the rear end of said top framework, and extensible means connecting the lower end of said upright frame with the front end of the top framework, comprising a mounting framework having means to mount the device on a vehicle, and a front frame having its front end pivoted to the front end of the top framework and its rear end vertically spaced below the mounting framework and bars, rigid with the front frame, pivoted on the mounting framework, one of said bars extending above the mounting framework, a spring mounting support on the mounting framework rearwardly of said bar, and a coiled spring under tension connecting the upper ends of said extended bar and said support.

6. In a harvesting device for cutting and loading crops, a top rigid framework providing a support for an elevator draper, a rear upright frame, also rigid, pivoted to the rear end of said top framework, and extensible means connecting the lower end of said upright frame with the front end of the top framework, comprising a mounting framework having means to mount the device on a vehicle, and a front frame having its front end pivoted to the front end of the top framework and its rear end vertically spaced below the mounting framework and bars, rigid with the front frame, pivoted on the mounting framework, one of said bars extending above the mounting framework, a spring mounting support on the mounting framework rearwardly of said bar, means to raise and lower the support, and spring means connecting the support with the upper end of said bar.

HORACE D. HUME.

REFERENCES CITED

The following references are of record in the file of this patent:

UNITED STATES PATENTS

| Number | Name | Date |
|---|---|---|
| 792,549 | Penrose | June 13, 1905 |
| 973,892 | Teeter | Oct. 25, 1910 |
| 1,273,312 | Baum | July 23, 1918 |
| 1,648,767 | Hay | Nov. 8, 1927 |
| 1,848,532 | Lang | Mar. 8, 1932 |
| 2,125,007 | Ossing | July 26, 1938 |
| 2,251,667 | Ehinger | Aug. 5, 1941 |